3,206,360
PURIFICATION OF BASIC ANTIBIOTICS
Heinz K. Jahnke, Kalamazoo, Mich., assignor to The Upjohn Company, Kalamazoo, Mich., a corporation of Delaware
No Drawing. Filed June 18, 1962, Ser. No. 203,011
14 Claims. (Cl. 167—65)

This invention pertains to a novel chemical process, and is particularly directed to an improved process for recovering and purifying basic antibiotics by adsorption on a cation exchange resin. More particularly, the invention is directed to a novel method which comprises incorporating a water-soluble fluoride into an aqueous solution containing a basic antibiotic and contaminative polyvalent metal ions and removing insoluble polyvalent metal fluorides so as to avoid interference of the polyvalent metal ions with the sorption of the antibiotic.

Basic antibiotics, for example, actinospectacin, neomycin, streptomycin, and the like, are recovered and purified from fermentation beers produced by well-known methods of culture. In general, an antibiotic-producing microorganism is cultured in a vessel containing a nutrient medium comprising a carbon source, for example, an assimilable carbohydrate, a nitrogen source, for example, an assimilable nitrogenous compound or proteinaceous substance and other components. Temperature, aeration, and agitation of the culture medium are controlled as desired until the fermentation is terminated. The fermentation beer is withdrawn from the vessel and processed so as to obtain the desired antibiotic.

In accordance with the usual practice, the whole beer is filtered to remove the vegetative microorganism and other solid materials. The filtrate is then treated for solvent extraction of the antibiotic, or for adsorption of the antibiotic on a cation exchange resin. In the latter method of recovery, polyvalent metal ions derived from components of the culture medium compete with the basic antibiotic for reactive sites on the resin and thus reduce efficiency of the resin and recovery of the antibiotic. Calcium, magnesium, iron, and aluminum are polyvalent metal ions that may occur in the fermentation beers in concentrations sufficient to influence the efficiency of the resin.

The magnitude of the problem caused by polyvalent metal ion interference is demonstrated by an experiment conducted for the purpose of correlating the adsorptive efficiency of a cation exchange resin for actinospectacin in the presence of varying concentrations of calcium and magnesium ions. A solution assaying 1000 γ/ml. of actinospectacin activity was prepared, and divided into 8 40-ml. portions. As listed in the table (below), different amounts of calcium and magnesium were added to 7 of the portions and one was used as a control. Each portion was contacted with a given amount (1 ml.) of a polyacrylic acid resin obtained by copolymerization of 95 parts of methacrylic acid and 5 parts of divinylbenzene according to the procedure given on page 87 of Kunin, "Ion Exchange Resins" (1958, 2nd ed.), John Wiley and Sons, Inc., New York. The resin was adjusted to pH 6.0 with sodium hydroxide. The results were as follows:

TABLE

| Series No. | $Mg^{++}$, mM./l. | $Ca^{++}$, mM./l. | "Spent" Assay, γ/ml. |
|---|---|---|---|
| 1 | 0.0 | 0.0 | 0 |
| 2 | 2.6 | 0.0 | 0 |
| 3 | 5.2 | 0.0 | 0 |
| 4 | 7.8 | 0.0 | trace |
| 5 | 7.8 | 1.57 | 112 |
| 6 | 7.8 | 3.14 | 175 |
| 7 | 7.8 | 4.71 | 450 |
| 8 | 11.10 |  | 860 |

These data show that calcium and magnesium ions when present together at concentrations of 7.8 and 1.57 mM./l. respectively, reduce the efficiency of the resin about 10 percent. Similarly, when the calcium ion concentration is increased to 3.14 mM./l. and 4.71 mM./l, the efficiency of the resin is reduced about 20 percent and about 45 percent, respectively. Magnesium ions alone at 11.0 mM./l. reduce the efficiency of the resin about 85 percent.

The significance of these data in relation to actual conditions encountered in production can be more fully appreciated in view of the fact that in Series 7 a total concentration of 125 mM./l. of calcium and magnesium reduced the efficiency of the resin about 45 percent whereas fermentation beers frequently contain 20 mM./l. or more of calcium and magnesium ions.

Now, in accordance with this invention, the competitive adsorption of polyvalent metal ions is avoided by incorporating in an aqueous solution of a basic antibiotic such as a whole fermentation beer, a filtered beer, a cation exchange resin eluate, and like aqueous solutions, a quantity of a water-soluble fluoride so as to form insoluble polyvalent metal fluorides and non-competitive anionic fluoride complexes. Thus in accordance with the invention, for example, insoluble fluorides of calcium and magnesium are formed, and the non-competitive anionic fluoride, aluminum hexafluoride$(AlF_6)^{-3}$, is formed. In these ways (it should be understood that the invention is not limited to the foregoing mechanisms), polyvalent metal ions are converted to non-interfering forms and more efficient cationic exchange recovery and purification of the desired basic antibiotic is attained.

In practice, the advantages of the invention are realized by incorporating a quantity of water-soluble fluoride at least sufficient to remove polyvalent metal ions. Usually, an excess of a water-soluble fluoride is used. Suitable water-soluble fluorides include, for example, sodium fluoride, potassium fluoride, amomnium fluoride, and the like. The fluoride can be added to a whole fermentation beer prior to filtration, or it can be added to a filtered beer.

Treatment of a whole fermentation beer is convenient and one filtration removes insoluble polyvalent metal fluorides as well as vegetative microorganism and other solid materials.

However, a whole beer sometimes requires greater amounts of fluoride than a filtered beer, and the desirability of treating either a whole fermentation beer or a filtered beer must be determined after evaluating factors such as convenience, economics, and polyvalent metal tolerances in the filtered beer.

In general, treatment of a whole beer requires about 5 g. per l. of sodium fluoride or an equivalent amount of other fluorides, while about 2 g. per l. is sufficient for a filtered beer. There are no real upper limits to the amount of fluoride that can be added to a whole or filtered beer because the added ions do not interfere in the cation exchange process. However, enough to provide an excess of fluoride ions over that needed to combine with the polyvalent metal ions is desirable in order to assure efficacy. The insoluble polyvalent metal fluorides are removed from the treated solution by conventional methods such as filtration, centrifugation, and the like.

The treatment and separation of insoluble polyvalent metal fluorides can be carried out over a range of hydrogen ion concentrations from about pH 4 to about pH 10. A preferred range is from about pH 6 to about pH 8.

After treatment with the water-soluble fluoride and separation, the solution of the basic antibiotic is contacted with a cation exchange resin for adsorption of the antibiotic. Carboxylic or sulfonic acid resins can be used. Suitable carboxylic acid resins include the polyacrylic acid resins obtained by the copolymerization of methacrylic or acrylic acid and divinylbenzene by the procedure given on page 87 of Kunin, supra. Carboxylic acid cation exchange resins of this type are marketed under the trade names Amberlite IRC–50, Ionac C–270, Duolite CS–101, Permutit H–70 and Zeokarb 226. Suitable sulfonic acid resins include nuclear sulfonated polystyrene resins cross-linked with divinylbenzene obtained by the procedure given on page 84 of Kunin, supra. Sulfonated cation exchange resins of this type are marketed under the trade names, Dowex–50, Amberlite IR–120, Nalcite HCR, Duolite C–20, Permutit Q, and Zeokarb 225.

The following particular descriptions of the novel process of the invention involve the recovery and purification of neomycin and the new antibiotic actinospectacin.

Actinospectacin is a basic compound elaborated by the microorganisms Streptomyces spectabilis, and various methods for its production, recovery, and purification are described in published literature, e.g., D. J. Mason et al., Antibiotics and Chemotherapy, 11, 118 (1961); M. E. Bergy et al., Antibiotics and Chemotherapy, 11, 661 (1961); Union of South Africa Patent No. 60/4,098 and Belgium Patent No. 596,175. The following method incorporates the novel process of this invention and illustrates how the advantages of the new method are achieved with actinospectacin.

A whole beer is acidified to about pH 2.5 to about pH 3.5 and filtered. The acidification is advantageously accomplished with a strong, non-oxidizing mineral acid, for example, concentrated sulfuric acid (preferred), hydrochloric, phosphoric, and the like. The filtered beer is treated with from about 1 to about 5 grams of a water-soluble salt of fluorine of the kind indicated above and stirred for about 30 minutes before refiltering. The refiltered beer is then adjusted to about pH 5.5 to pH 7.0 with a base, for example, sodium hydroxide, sodium carbonate, and like bases, and brought into contact with a cation exchange resin in, for example, the hydrogen, the sodium, and like forms. Various carboxylic acid resins can be used, illustratively, those described hereinabove. In accordance with a preferred procedure for contacting the neutralized beer with the cation exchange resin, the beer is pumped downflow through a packed column of the resin.

The adsorbed actinospectacin is eluted from the cation exchange resin as the sulfate salt. Elution is effected by charging the resin column with a suitable volume of water (enough is used to produce a slurry with the resin) and acidifying with sulfuric acid. The acid is added batch-wise with vigorous mixing of the slurry until the mixture is maintained at about pH 1 to 4, preferably about pH 1.5 to 2.0. The acid solution is then drained from the resin column and the column is blown dry with air under pressure. If desired, the elution can be repeated in order to obtain a further yield of actinospectacin from the resin.

The eluate is neutralized to about pH 6 to 7 with base, e.g., sodium hydroxide, sodium carbonate, and the like or with a basic anion exchange resin so as to remove excess acid over that necessary to form the actinospectacin sulfate. Suitable anion exchange resins for this purpose are obtained by chloromethylating by the procedure given on pages 88 and 97 of Kunin, supra, polystyrene cross-linked, if desired, with divinylbenzene prepared by the procedure given on page 84 of Kunin, supra, and reacting with trimethylamine, dimethylamine, or dimethylethanolamine, by the procedure given on page 97 of Kunin, supra. Anion exchange resins of this type are marketed under the trade names Dowex 1, Dowex 2, Dowex 3, Dowex 21K, Ionac A–300, Amberlite IRA–400, Amberlite IR–45, Duolite A–102, and Duolite A–2, A–4, and A6. After neutralization, the eluate is filtered and then concentrated for crystallization.

Crystallization of actinospectacin sulfate is advantageously accomplished by adding about 4 volumes of methanol to the concentrated eluate.

Advantageously, the methanol is added as rapidly as possible with vigorous stirring and the mixture is filtered immediately in order to remove precipitated materials before crystallization of actinospectacin sulfate begins. Crystallization of the actinospectacin sulfate takes place readily at about 20° to 50° C. Reducing the temperature to about 10° to 15° before final filtration improves the yield.

In accordance with an alternative procedure a concentrated eluate is adjusted to about pH 8 with a base, e.g., sodium hydroxide, sodium carbonate, potassium hydroxide, or with a basic anion exchange resin of the kind set forth above. About 4 volumes of methanol is then added, the mixture is filtered, and the filtrate is acidified to about pH 5 with sulfuric acid in order to permit crystallization of actinospectacin sulfate.

If desired, the actinospectacin sulfate thus obtained can be crystallized by dissolving in water, adding a lower alkanone, for example, acetone or methyl ethyl ketone and crystallizing. The crystals are recovered on a filter, washed with aqueous alkanone solution, and, if desired, with anhydrous alkanone and then dried.

The following examples describe some preferred forms and practices of this invention, but they are not to be construed as limiting the scope thereof.

*Example 1*

The significant advantages of the process of this invention are demonstrated by the enhanced resin efficiency observed after treatment of an aqueous solution containing a basic antibiotic and contaminative polyvalent metal ions with a water-soluble fluoride. Illustratively, two 4.0-l. portions of a filtered actinospectacin beer containing 20 mM./l. of calcium and magnesium were adjusted to pH 6.5 and passed down-flow, at a flow rate of 10 ml./min., through 100 ml. of the polyacrylic acid resin prepared and adjusted to pH 6.0 as described above in connection with the Table. One of the portions was treated with 2.0 g./l. of sodium fluoride and refiltered before passing it through the resin. The resin columns were eluted with aqueous sulfuric acid at pH 1.8 and the actinospectacin sulfate was crystallized in the manner described above. The results were as follows:

| | Untreated | Treated with 2.0g./l. NaF |
|---|---|---|
| Spent Beer assay (γ/ml.) | 500 | 250 |
| Total amount of actinospectacin activity in the eluate (g.) | 1.02 | 1.94 |
| Actinospectacin sulfate crystals (g.) | 0.73 | 2.18 |
| Percent increase in yield | | 200 |

These data show that treatment of the filtered beer with sodium fluoride doubled the recovery of actinospectacin activity in the eluate and tripled the yield of finished crystals. Following the procedure of this invention, therefore, lesser amounts of resin can be used than would ordinarily be required for complete recovery of antibiotic from the beer.

*Example 2*

Similar results have been obtained using filtered beers containing neomycin prepared according to the procedure described by Koepsell and Ford in Neomycin, Chap. 6 (2nd ed., 1958), Williams and Wilkins, Baltimore. For example, in a comparison test, two liters of a filtered beer containing 3.2 mg./ml. of neomycin was adjusted to pH 8 with aqueous sodium hydroxide and filtered. One liter of the filtrate was treated with 5 g. of sodium fluoride for 30 minutes and filtered. The filtrate was contacted with 8 g. of the polyacrylic acid resin prepared as described above in connection with the Table and containing 50% sodium ions (equivalent to 5.6 ml. in the hydrogen cycle). The resin suspension was stirred for 5 hrs. at 60° C., the resin was separated, and the neomycin was eluted with dilute aqueous sulfuric acid at pH 1.8. There was thus obtained 50 ml. of eluate containing 50 mg./ml. (2.5 g.) of neomycin free base equivalent to 446 mg./ml. of resin.

In the same way, the second liter of the filtrate was contacted with 8 g. of the resin, but without the sodium fluoride treatment, and the neomycin was eluted. The 50 ml. of eluate contained 30.5 mg./ml. (1.53 g.) of neomycin free basequivalent to 273 mg./ml. of resin. Hence, the sodium fluoride treatment of the neomycin filtered beer contributed significantly to the recovery of the antibiotic in the cation exchange resin eluate.

*Example 3*

The efficacy of the process of the invention in treatment of a whole fermentation beer is demonstrated by the following experiment:

Four 100-ml. portions of a neomycin whole beer were treated with different amounts of sodium fluoride, agitated for 30 min. at 60° C., and filtered. The concentration of calcium and magnesium in the filtrates was determined according to the titrimetric procedure of Reilly et al., Anal. Chem., 30, 947 (1958), and Reilly et al., ibid., 30, 953 (1958), and the results are tabulated below for two experiments.

| | Am't of sodium fluoride added, g./100 ml. | $Ca^{++}$ and $Mg^{++}$ mM./l. |
|---|---|---|
| Series A | 0 | 22.5 |
| | 0.1 | 17.5 |
| | 0.25 | 10 |
| | 0.5 | 4 |
| | 0.75 | 3 |
| Series B | 0 | 20 |
| | 0.1 | 8 |
| | 0.25 | 5 |
| | 0.5 | 3 |
| | 1.0 | 3 |

These data show that the concentration of calcium and magnesium ions in a whole fermentation beer is substantially reduced by treatment with sodium fluoride and that about 5 g. of the salt per liter of beer is effective.

I claim:
1. The method for avoiding interference of polyvalent metal ions in the process of adsorbing a basic antibiotic on a cation exchange resin which comprises incorporating a water-soluble fluoride into an aqueous solution containing a basic antibiotic and polyvalent metal ions, and removing insoluble polyvalent metal fluorides prior to contacting the said solution with the resin.

2. The process according to claim 1 wherein the basic antibiotic is actinospectacin.

3. The process according to claim 1 wherein the basic antibiotic is neomycin.

4. The method of avoiding interference by polyvalent metal ions with adsorption of a basic antibiotic on a cation exchange resin which comprises treating a fermentation beer containing a basic antibiotic and polyvalent metal ions with a water-soluble fluoride, removing insoluble polyvalent metal fluorides, and then contacting the treated beer with a cation exchange resin.

5. The method of claim 4 wherein the fermentation beer contains actinospectacin.

6. The method of claim 4 wherein the fermentation beer contains neomycin.

7. The process for removing calcium and magnesium ions from a fermentation beer containing a basic antibiotic which comprises adding about 2 to about 5 g. of sodium fluoride per liter of solution and removing the insoluble calcium and magnesium fluorides.

8. The process of claim 7 wherein the fermentation beer contains actinospectacin and is filtered before treatment with about 2 g. of sodium fluoride per liter.

9. The process of claim 7 wherein the fermentation beer is a whole beer containing neomycin and is treated with about 5 g. of sodium fluoride per liter of beer.

10. The method of improving the adsorption on and recovery of actinospectacin from cation exchange resins by avoiding the interference of polyvalent metal ions which comprises treating a filtered beer containing actinospectacin with about 2 g. of sodium fluoride per liter of beer, and removing insoluble polyvalent metal fluorides prior to contacting the treated beer with the cation exchange resin.

11. The method of improving the adsorption on and recovery of neomycin from cation exchange resins by avoiding the interference of polyvalent metal ions which comprises treating a filtered beer containing neomycin with about 2 g. of sodium fluoride per liter of beer, and removing insoluble polyvalent metal fluorides prior to contacting the treated beer with the cation exchange resin.

12. In the process for recovering and purifying a basic antibiotic which comprises filtering a whole fermentation beer to remove the vegetative microorganism and other solids and contacting the filtered beer with a cation exchange resin, the improvement which consists of incorporating a water-soluble fluoride and removing insoluble polyvalent metal fluorides in order to avoid interference of polyvalent metal ions on the resin.

13. The process according to claim 12 wherein the basic antibiotic is neomycin, the cation exchange resin is a carboxylic acid resin, and about 5 g./l. of sodium fluoride is added.

14. The process according to claim 12 wherein the basic antibiotic in actinospectacin, the cation exchange resin is a carboxylic acid resin, and about 2 g./l. of sodium fluoride is added.

References Cited by the Examiner

UNITED STATES PATENTS

| 2,528,022 | 10/50 | Von Dolah et al. | 167—72 |
| 2,627,493 | 2/53 | Merckel et al. | 167—93 |
| 2,786,831 | 3/57 | Bartels et al. | 167—72 |
| 2,960,437 | 11/60 | Friedman et al. | 167—72 |
| 3,000,792 | 9/61 | Denkwealter et al. | 167—72 |
| 3,000,873 | 9/61 | Wolf | 167—72 |
| 3,105,013 | 9/63 | Saul et al. | 167—93 |

OTHER REFERENCES

Nachod et al.: "Ion Exchange Technology," Academic Press, New York, 1956, pp. 574–583.

FRANK CACCIAPAGLIA, JR., *Primary Examiner.*